US010029308B2

(12) United States Patent
Kawada et al.

(10) Patent No.: US 10,029,308 B2
(45) Date of Patent: Jul. 24, 2018

(54) THREE DIMENSIONAL PRINTER

(71) Applicant: Sodick Co., Ltd., Kanagawa (JP)

(72) Inventors: Shuichi Kawada, Kanagawa (JP);
Katsutaka Muranaka, Kanagawa (JP);
Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 424 days.

(21) Appl. No.: 14/804,833

(22) Filed: Jul. 21, 2015

(65) Prior Publication Data

US 2016/0067781 A1 Mar. 10, 2016

(30) Foreign Application Priority Data

Sep. 5, 2014 (JP) ................................. 2014-181726

(51) Int. Cl.
| | |
|---|---|
| *B29C 45/24* | (2006.01) |
| *B29C 33/54* | (2006.01) |
| *B22F 3/105* | (2006.01) |
| *B23K 26/08* | (2014.01) |
| *B29C 67/00* | (2017.01) |

(Continued)

(52) U.S. Cl.
CPC .......... *B22F 3/1055* (2013.01); *B23K 26/083* (2013.01); *B29C 67/0077* (2013.01); *B29C 67/0085* (2013.01); *B22F 2003/1056* (2013.01); *B22F 2003/1059* (2013.01); *B33Y 10/00* (2014.12); *B33Y 30/00* (2014.12); *Y02P 10/295* (2015.11)

(58) Field of Classification Search
CPC ............ B22F 3/1055; B22F 2003/1059; B22F 2003/1056; B29C 64/20; B29C 64/214; B29C 64/255; B29C 64/35
See application file for complete search history.

(56) References Cited

U.S. PATENT DOCUMENTS

2013/0108726 A1  5/2013  Uckelmann et al.

FOREIGN PATENT DOCUMENTS

| CN | 103695681 A | 4/2014 |
|---|---|---|
| DE | 202011003443 U1 | 2/2012 |
| EP | 1316408 A1 | 6/2003 |

(Continued)

OTHER PUBLICATIONS

Japanese OA dated May 26, 2015 from corresponding Japanese Application No. 2014-181726; 4 pgs.

(Continued)

*Primary Examiner* — Joseph S Del Sole
*Assistant Examiner* — Thu Khanh T Nguyen
(74) *Attorney, Agent, or Firm* — Maier & Maier, PLLC

(57) ABSTRACT

A lamination molding apparatus which can remove the non-sintered material powder after completion of lamination molding easily and with less time after completion of laminating/molding, is provided. According to embodiments of the present invention, a lamination molding apparatus to conduct lamination molding using a material powder, including: a chamber filled with an inert gas having a predetermined concentration; a molding table provided in the chamber, the molding table being capable of moving vertically; a powder retaining wall surrounding the molding table so as to retain the material powder supplied on the molding table; and a powder discharging section provided on or below the powder retaining wall, the powder discharging section being capable of discharging the material powder, is provided.

6 Claims, 10 Drawing Sheets

(51) Int. Cl.
  *B33Y 30/00* (2015.01)
  *B33Y 10/00* (2015.01)

(56) References Cited

FOREIGN PATENT DOCUMENTS

| JP | 2002-248691 A | 9/2002 |
| JP | 3770206 B2 | 12/2003 |
| JP | 2013-049137 A | 3/2013 |

OTHER PUBLICATIONS

Chinese Office Action dated Jan. 12, 2017, in connection with corresponding CN Application No. 201510556171.7 (8 pgs., including English translation).
German OA dated Mar. 29, 2016 from corresponding Application No. DE10 2015 215 270.7; 8 pgs.

THREE DIMENSIONAL PRINTER

BACKGROUND OF THE INVENTION

Field of the Invention

The present invention relates to a lamination molding device.

Background of the Invention

In a lamination molding method (laser lithography) of metal using laser beam, a very thin material powder layer is formed on a molding table capable of moving vertically, followed by irradiation of the material powder layer with a laser beam, thereby sintering the material powder. These procedures are repeated to obtain the desired modeled object. As the lamination molding proceeds, the molding table descends gradually, and thus the non-sintered material powder is maintained in a space surrounded by the molding table and a powder retaining wall provided around the molding table.

After the lamination molding is completed, the non-sintered material powder need be removed from the space on the molding table, and Patent Literature 1 discloses of evacuating the non-sintered material powder using a vacuum apparatus.

PRIOR ART DOCUMENTS

Patent Literature

[Patent Literature 1] JP 3770206B

SUMMARY OF INVENTION

Technical Problem

However, the method disclosed in Patent Literature 1 requires burden and time, and thus a method for removing the non-sintered material powder more easily with less time is desirable.

The present invention has been made by taking these circumstances into consideration. An object of the present invention is to provide a lamination molding apparatus which can remove the non-sintered material powder after completion of lamination molding easily and with less time.

Means to Solve the Problem

According to the present invention, a lamination molding apparatus to conduct lamination molding using a material powder, comprising: a chamber filled with an inert gas having a predetermined concentration; a molding table provided in the chamber, the molding table being capable of moving vertically; a powder retaining wall surrounding the molding table so as to retain the material powder supplied on the molding table; and a powder discharging section provided on or below the powder retaining wall, the powder discharging section being capable of discharging the material powder, is provided.

Effect of the Invention

In the present invention, a powder discharging section capable of discharging the material powder is provided on the powder retaining wall or below the powder retaining wall. Accordingly, the non-sintered material powder can be discharged via the powder discharging section after completion of the lamination molding, and thus the non-sintered material powder can be removed easily and with less time.

Hereinafter, various embodiments of the present invention will be provided. The embodiments provided below can be combined with each other.

Preferably, the lamination molding apparatus further comprises an upper wiper arranged at a periphery of the molding table, the upper wiper sliding on the powder retaining wall during movement of the molding table.

Preferably, the lamination molding apparatus further comprises a bucket to receive the material powder discharged from the powder discharging section.

Preferably, the lamination molding apparatus further comprises a chute to guide the material powder discharged from the powder discharging section to the bucket.

Preferably, the lamination molding apparatus further comprises a chute guide fixed to the chute to guide the material powder discharged from the powder discharging section to the chute.

Preferably, the lamination molding apparatus further comprises: a driving mechanism partition to surround a driving mechanism of the molding table; and a lower wiper fixed to the chute provided at a position lower than the chute, the lower wiper sliding on the driving mechanism partition during movement of the molding table.

Preferably, the powder discharging section is provided below a lower limit of a stroke of the molding table during the lamination molding.

Preferably, the molding table is configured so as to be raised after discharging the material powder.

BRIEF DESCRIPTION OF THE DRAWINGS

The above further objects, features and advantages of the present invention will become more apparent from the following detailed description taken in conjunction with the accompanying drawings, wherein.

DESCRIPTION OF THE PREFERRED EMBODIMENTS

Hereinafter, the embodiments of the present invention will be described with reference to the drawings. Here, the characteristic matters shown in the embodiments can be combined with each other.

Figure 1:
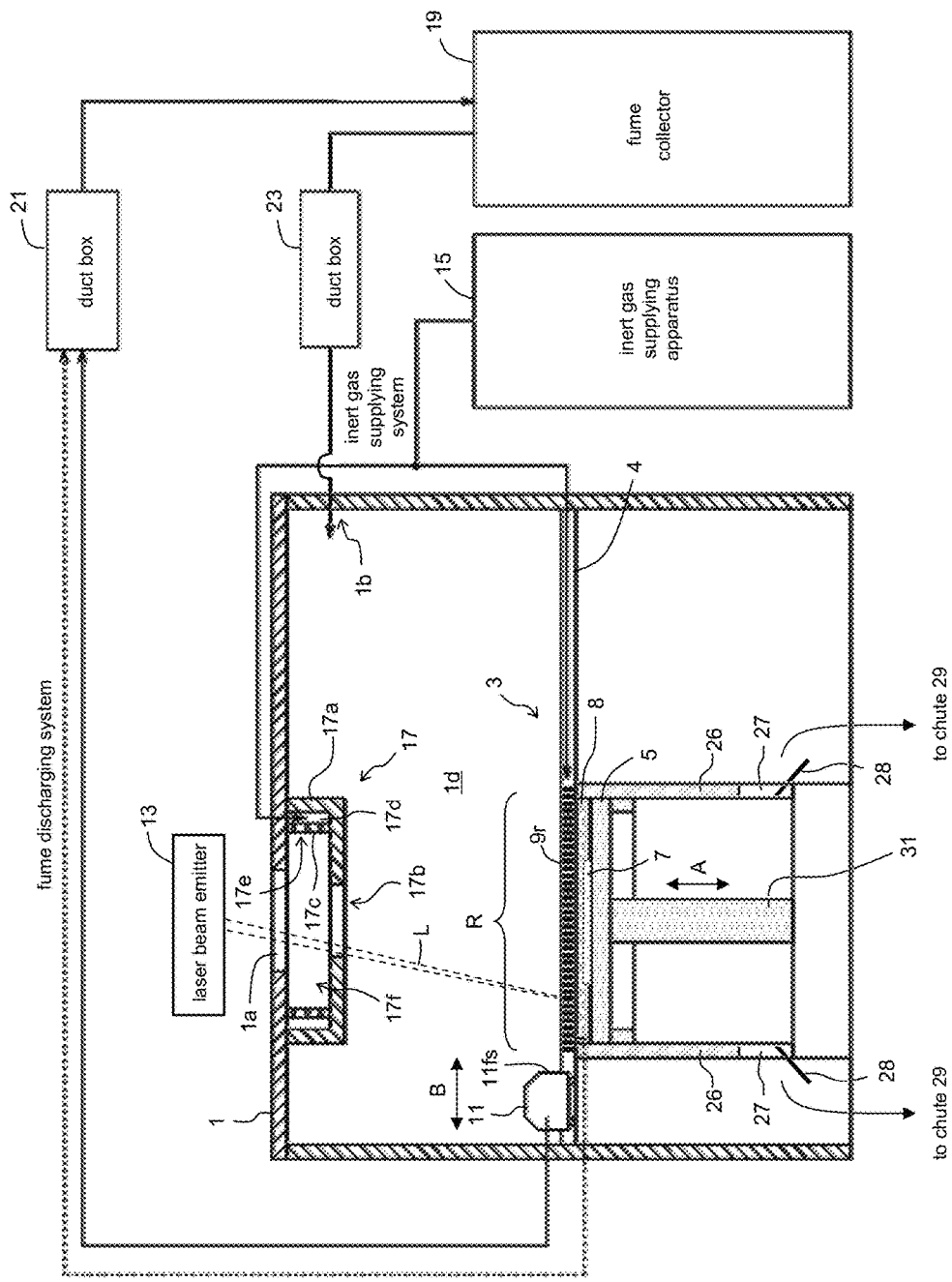
FIG. 1 is a rough structural diagram of the lamination molding apparatus according to one embodiment of the present invention.
Figure 2:
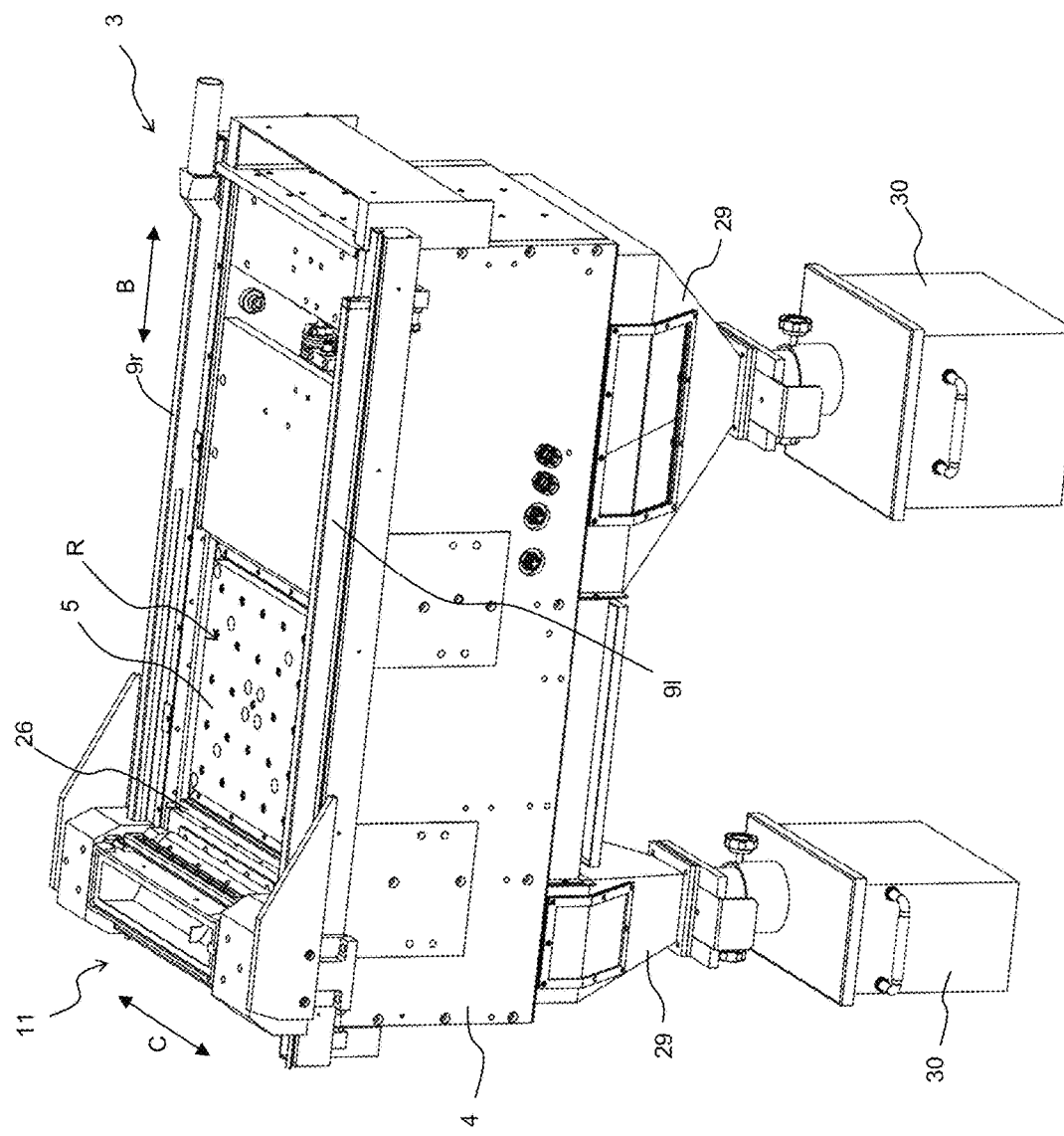
FIG. 2 is a perspective view of the powder layer forming apparatus 3.
Figure 3:
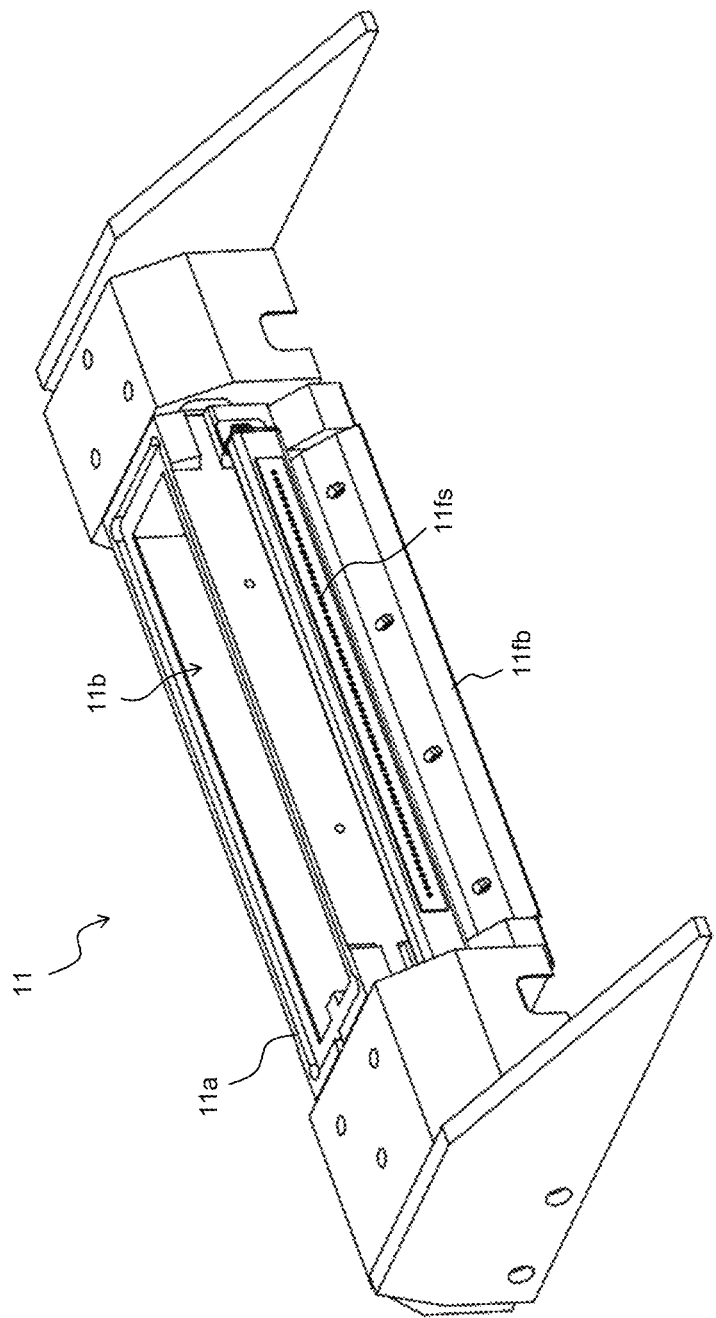
FIG. 3 is a perspective view of the recoater head 11.

As shown in FIGS. 1 and 2, the lamination molding apparatus according to one embodiment of the present invention is structured by providing the powder layer forming apparatus 3 in the chamber 1. The powder layer forming apparatus 3 comprises a base 4 having a molding region R, a recoater head 11 provided on the base 4 and being capable of moving in a horizontal uniaxial direction (direction shown by arrow B), and elongated members 9r and 9l provided on both sides of the molding region R along the moving direction of the recoater head 11. The molding region R is provided with a molding table 5 capable of moving vertically by the driving mechanism 31 (direction shown by arrow A in FIG. 1). When the lamination molding apparatus is used, a molding plate 7 is arranged on the molding table 5, and a material powder layer 8 is formed on the molding table 5. In addition, a powder retaining wall 26 is provided so as to surround the molding table 5, and the non-sintered material powder is retained in a powder retaining space 32 surrounded by the powder retaining wall 26 and the molding table 5 (shown in FIG. 7). Below the powder retaining wall 26, a powder discharging section 27 capable of discharging the material powder in the powder retaining space 32 is provided. The material powder discharged from the powder discharging section 27 is guided to a chute 29 by a chute guide 28, and then the material powder in the chute 29 is allowed to be contained in a bucket 30. The method for discharging the non-sintered material powder from the powder discharging section 27 will be explained later.

Figure 4:
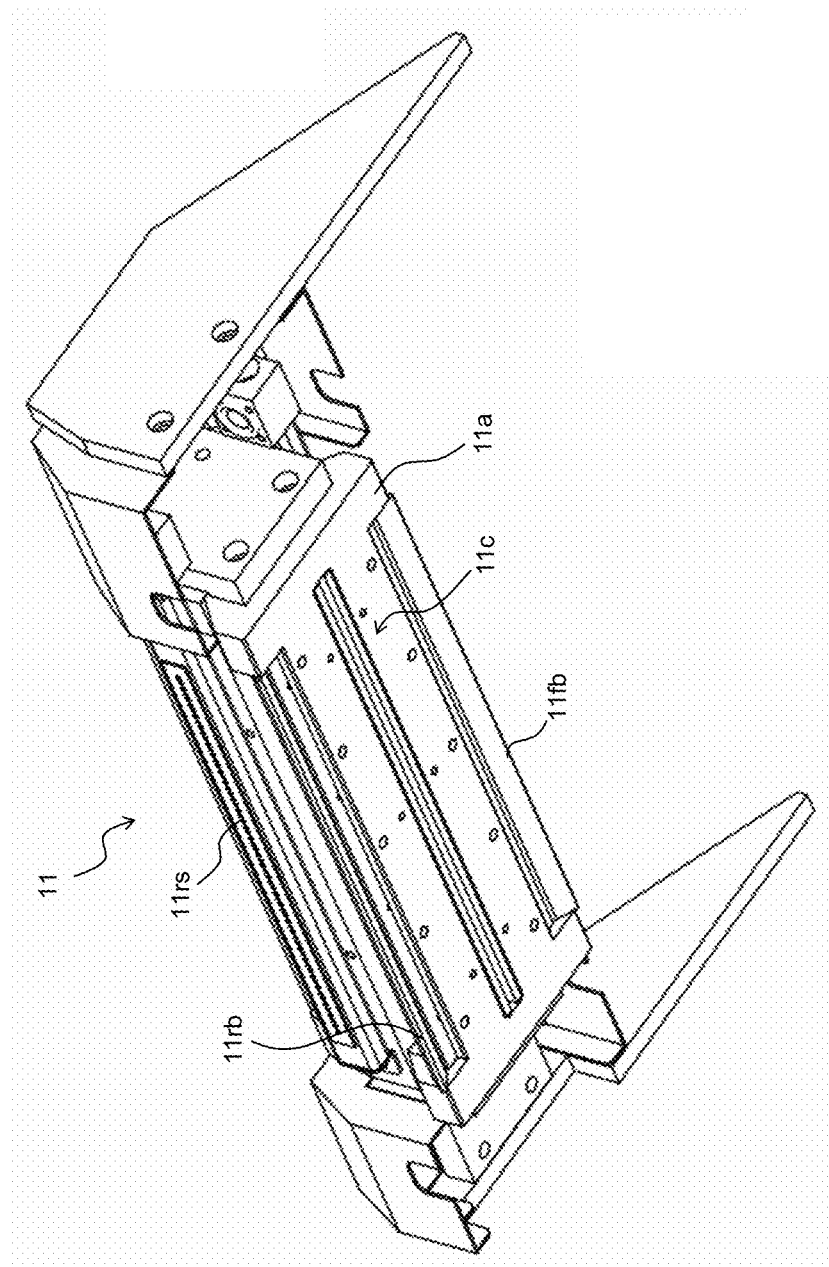
FIG. 4 is a perspective view of the recoater head 11 observed from another angle.

As shown in FIGS. 2 and 4, the recoater head 11 comprises a material holding section 11a, a material supplying section 11b provided on the top surface of the material holding section 11a, and a material discharging section 11c provided on the bottom surface of the material holding section 11a for discharging the material powder contained in the material holding section 11a. The material discharging section 11c has a slit shape which elongates in the horizontal uniaxial direction (direction shown by arrow C) crossing orthogonally with the moving direction (direction shown by arrow B) of the recoater head 11. On both sides of the recoater head 11, squeegee blades 11fb and 11rb for forming a material powder layer 8 by planarizing the material powder discharged from the material discharging section 11c are provided. In addition, on both sides of the recoater head 11, fume suction sections 11fs and 11rs for suctioning the fume generated during sintering of the material powder are provided. The fume suction sections 11fs and 11rs are provided along the horizontal uniaxial direction (direction shown by arrow C) crossing orthogonally with the moving direction (direction shown by arrow B) of the recoater head 11. The material powder is, for example, metal powder (iron powder for example) having a sphere shape with an average particle diameter of 20 μm.

The elongated members 9r and 9l are provided with openings. Here, the openings are provided along the moving direction (direction shown by arrow B) of the recoater head 11. One of these openings is used as the inert gas supplying opening, and the other is used as the inert gas discharging opening, thereby forming a flow of the inert gas in the direction shown by arrow C on the molding region R. Accordingly, the fume generated in the molding region R can be easily discharged along this flow of inert gas. Here, in the present specification, "inert gas" is a gas which substantially does not react with the material powder, and nitrogen gas, argon gas, and helium gas can be mentioned for example.

A laser beam emitter 13 is provided above the chamber 1. The material powder layer 8 formed in the molding region R is irradiated with the laser beam L emitted from the laser beam emitter 13 which is transmitted through a window 1a provided in the chamber 1. The laser beam emitter 13 need be structured so as to allow two-dimensional scanning of the laser beam L. For example, the laser beam emitter 13 is structured with a laser beam source for generating the laser beam L, and a pair of galvanometer scanner for allowing two-dimensional scanning of the laser beam L in the molding region R. There is no particular limitation to the type of the laser beam L, so long as it can sinter the material powder. For example, $CO_2$ laser, fiber laser, and YAG laser can be mentioned. The window 1a is formed with a material which can transmit the laser beam L. For example, in a case where the laser beam L is a fiber laser or a YAG laser, the window 1a can be structured with quartz glass.

On the upper surface of the chamber 1, the fume diffusing section 17 is provided so as to cover the window 1a. The fume diffusing section 17 is provided with a cylindrical housing 17a and a cylindrical diffusing member 17c arranged in the housing 17a. An inert gas supplying space 17d is provided in between the housing 17a and the diffusing member 17c. Further, on the bottom surface of the housing 17a, an opening 17b is provided at the inner portion of the diffusing member 17c. The diffusing member 17c is provided with a plurality of pores 17e, and the clean inert gas supplied into the inert gas supplying space 17d is filled into a clean space 17f through the pores 17e. Then, the clean inert gas filled in the clean space 17f is discharged towards below the fume diffusing section 17 through the opening 17b.

Next, the inert gas supplying system to supply the inert gas into the chamber 1 and the fume discharging system to discharge the fume from the chamber 1 are explained.

The inert gas supplying system to supply the inert gas into the chamber 1 is connected with the inert gas supplying apparatus 15 and the fume collector 19. The inert gas supplying apparatus 15 has a function to supply the inert gas, and is a gas cylinder containing inert gas, for example. The fume collector 19 comprises duct boxes 21 and 23 provided at its upper stream side and its lower stream side, respectively. The gas discharged from the chamber 1 (inert gas containing fume) is sent to the fume collector 19 through the duct box 21. Then, fume is removed in the fume collector 19, and the cleaned inert gas is sent to the chamber 1 through the fume duct box 23. According to such constitution, the inert gas can be recycled.

As shown in FIG. 1, the inert gas supplying system is connected with the upper supplying opening 1b of the chamber 1, the inert gas supplying space 17d of the fume diffusing section 17, and the elongated member 9l. The inert gas is filled in the molding space 1d of the chamber 1 through the upper supplying opening 1b. The inert gas supplied into the elongated member 9l is discharged onto the molding region R through the opening.

In the present embodiment, the inert gas from the fume collector 19 is sent to the upper supplying opening 1b, and the inert gas from the inert gas supplying apparatus 15 is sent to the inert gas supplying space 17d and the elongated member 9l. Although there is a possibility that the inert gas from the fume collector 19 contains residual fume, the constitution of the present embodiment does not permit the inert gas from the fume collector 19 be supplied into the space which requires especially high cleanliness (clean space 17f and the space at the periphery of the molding region R). Accordingly, the effect of the residual fume can be minimized.

As shown in FIGS. 1 and 4, the fume discharging system to discharge the fume from the chamber 1 is connected with the fume suction sections 11fs and 11rs of the recoater head 11, and with the elongated member 9r. Since the inert gas containing the fume in the molding space 1d of the chamber 1 is discharged through the fume suction sections 11fs and 11rs of the recoater head 11, and through the elongated member 9r, a flow of inert gas flowing from the upper supplying opening 1b towards the fume suction sections 11fs and 11rs of the recoater head 11, and towards the elongated member 9r is formed in the molding space 1d. The fume suction sections 11fs and 11rs of the recoater head 11 can suction the fume generated in the molding region R when the recoater head 11 passes over the molding region R. In addition, the inert gas containing the fume is discharged from the chamber 1 through the opening of the elongated member 9r. The fume discharging system is connected with the fume collector 19 through the dust box 21, and the inert gas after removal of the fume by the fume collector 19 is recycled.

Figure 5:
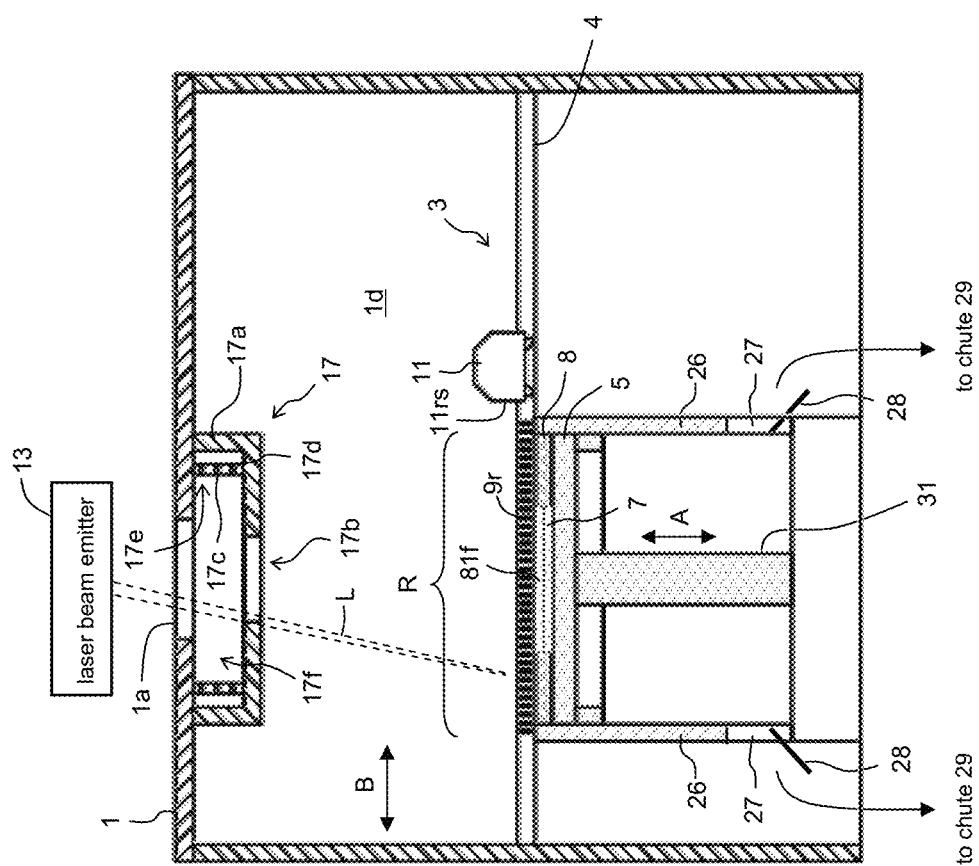
FIG. 5 is an explanatory drawing of the lamination molding method using the lamination molding apparatus according to one embodiment of the present invention.
Figure 6:
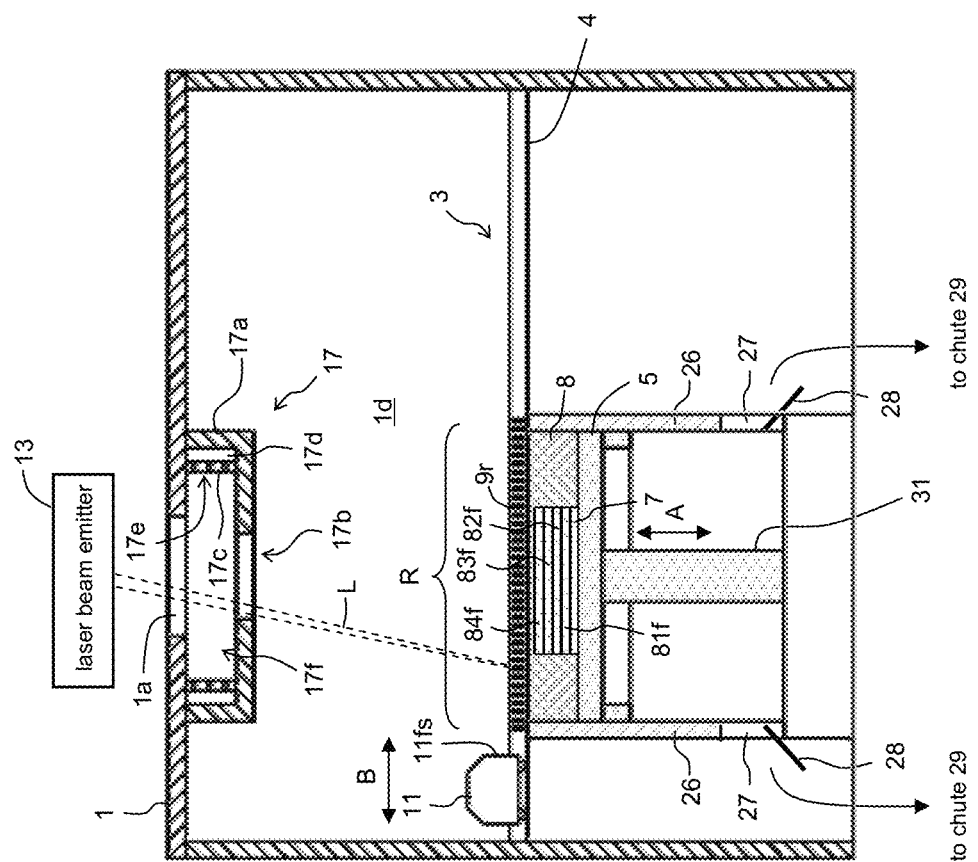
FIG. 6 is an explanatory drawing of the lamination molding method using the lamination molding apparatus according to one embodiment of the present invention.

Next, referring to FIGS. 1, 5, and 6, the lamination molding method using the lamination molding apparatus will be explained. Here, in FIGS. 5 and 6, the inert gas supplying system and the fume discharging system are not shown.

First, the molding plate 7 is placed on the molding table 5, and the height of the molding table 5 is adjusted to an appropriate position. In this state, the recoater head 11 with the material holding section 11a being filled with the material powder is moved from the left side to the right side of the molding region R, in the direction shown by arrow B in FIG. 1. Accordingly, a first layer of the material powder layer 8 is formed on the molding plate 7.

Subsequently, predetermined portion of the material powder layer 8 is irradiated with the laser beam L, thereby sintering the portion of the material powder layer 8 being irradiated with the laser beam. Accordingly, the first layer of sintered layer 81f is obtained as shown in FIG. 5.

Then, the height of the molding table 5 is descended by the thickness of one layer of the material powder layer 8. Subsequently, the recoater head 11 is moved from the right side to the left side of the molding region R. Accordingly, a second layer of the material powder layer 8 is formed on the sintered layer 81f.

Next, predetermined portion of the material powder layer 8 is irradiated with the laser beam L, thereby sintering the portion of the material powder layer 8 being irradiated with the laser beam. Accordingly, the second layer of sintered layer 82f is obtained as shown in FIG. 6.

By repeating these procedures, the third layer of sintered layer 83f, the fourth layer of sintered layer 84f, and the sintered layers thereafter are formed. The adjacent sintered layers are firmly fixed with each other.

Figure 7:
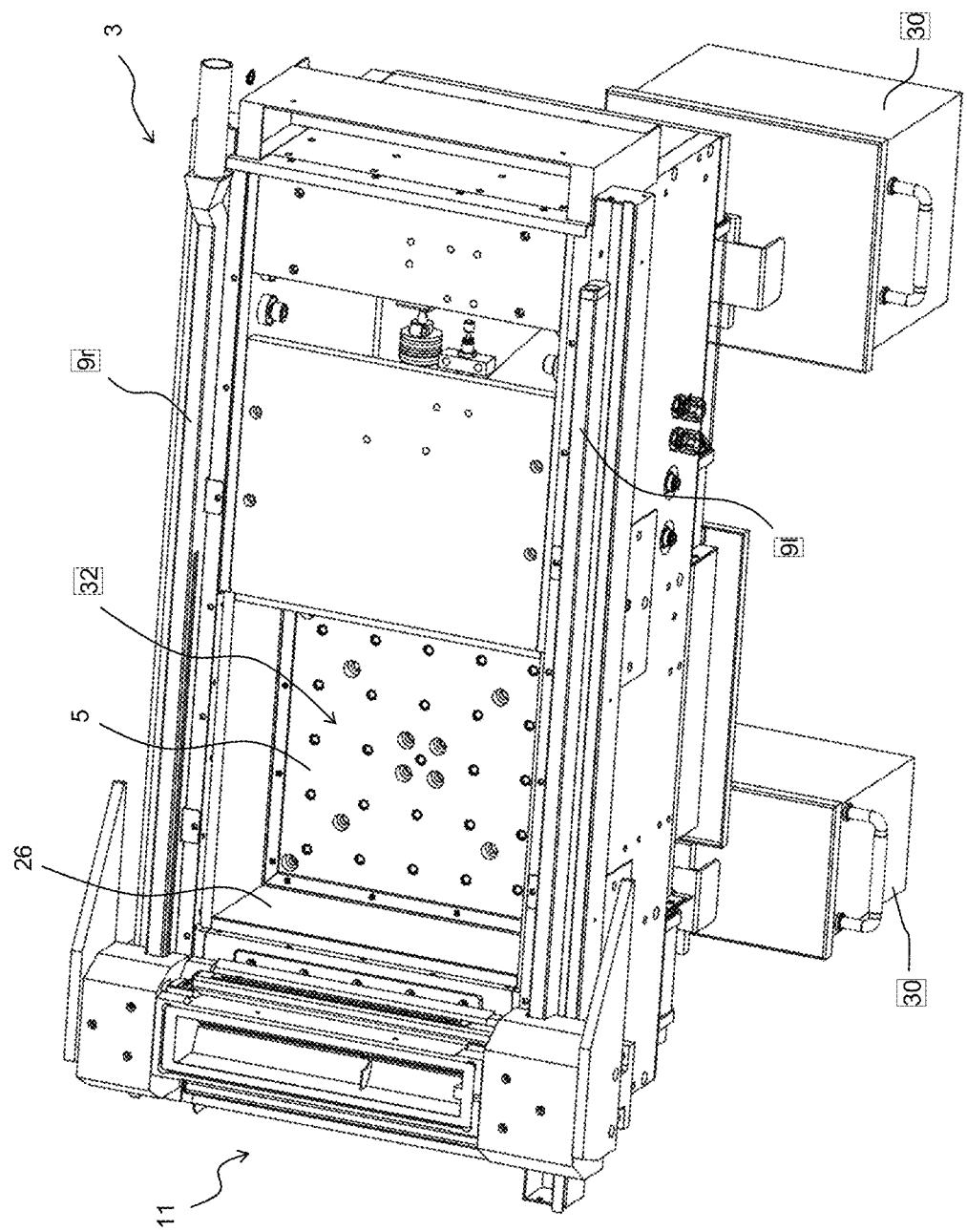
FIG. 7 is a perspective view showing the condition of the powder layer forming apparatus 3 when the lamination molding is completed.
Figure 8:
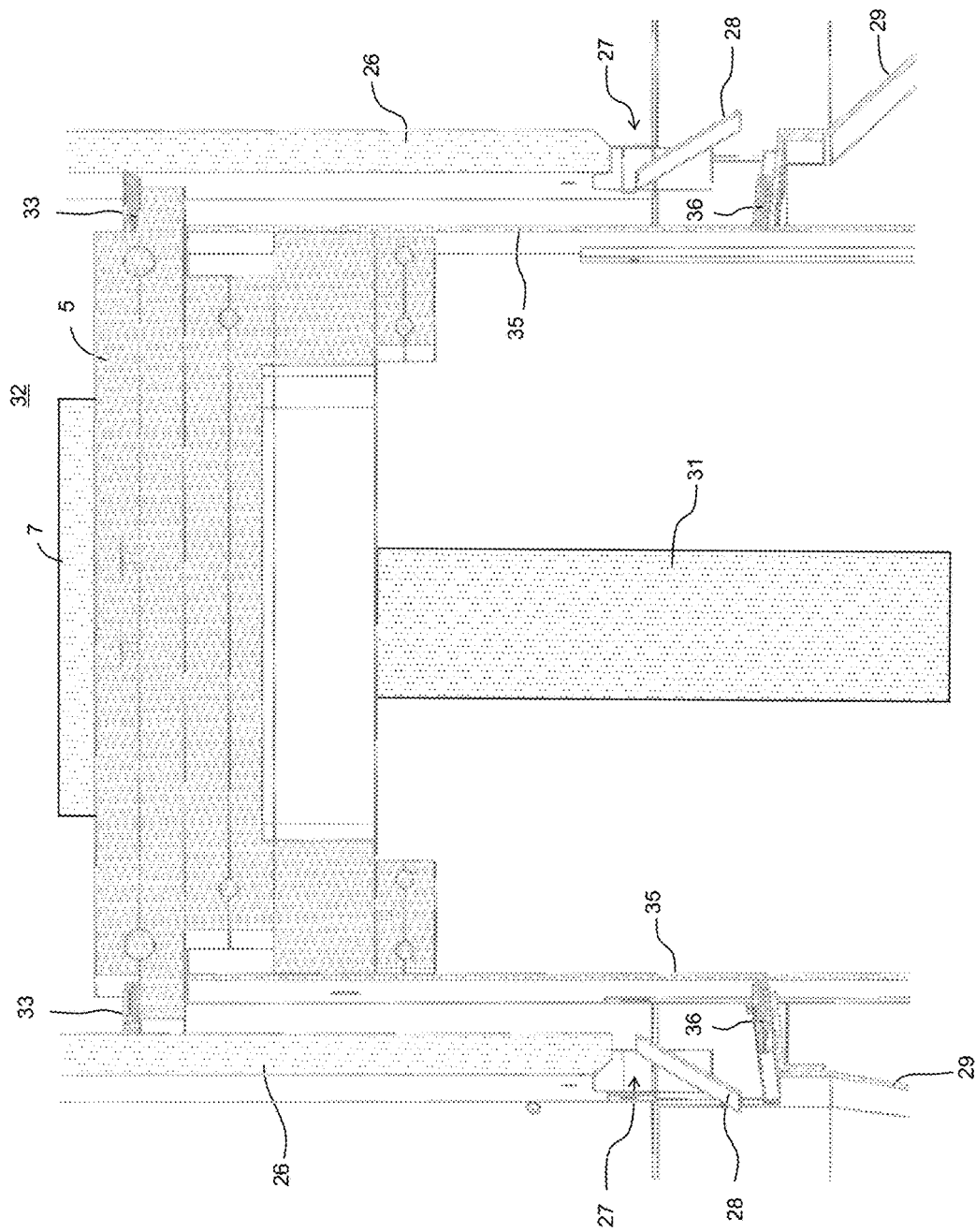
FIG. 8 is a cross sectional view of the molding table 5 and its surroundings in the condition of FIG. 7. The driving mechanism 31 is simplified. The same can be said with FIG. 9.

The lamination molding is completed by forming necessary number of the sintered layers. Here, the molding table 5 is descended each time the sintered layer is formed. Accordingly, when the lamination molding is completed, the molding table 5 is positioned lower than the position of the molding table 5 at the starting point as shown in FIG. 7. In such condition, the modeled object formed by lamination molding and the non-sintered material powder are retained in the powder retaining space 32 surrounded by the powder retaining wall 26 and the molding table 5. As shown in FIG. 8, the molding table 5 is not directly in contact with the powder retaining wall 26, and the upper wiper 33 arranged at the periphery of the molding table 5 contacts with the powder retaining wall 26. Here, when the molding table 5 moves, the upper wiper 33 slides on the powder retaining wall 26. With such structure, the material powder in the powder retaining space 32 can be prevented from leaking out. In addition, since the molding table 5 is heated with the heating mechanism during molding, the molding table 5 becomes hot. Therefore, a heat resistant wiper is used as the upper wiper 33.

Figure 9:
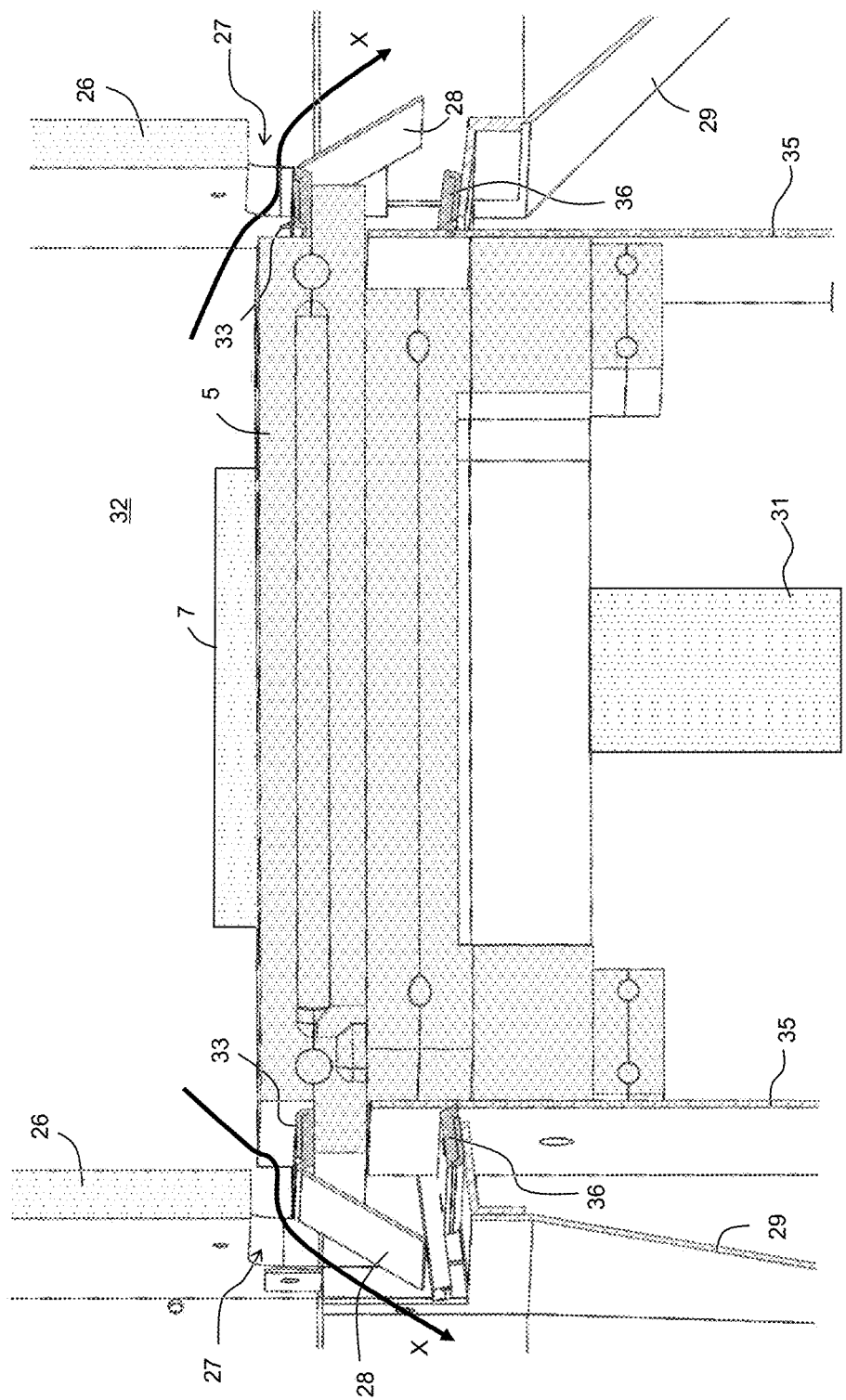
FIG. 9 is a cross sectional view showing a condition where the molding table 5 is descended from the condition of FIG. 8 so as to allow the powder discharging section 27 communicate with the powder retaining space 32.

As shown in FIG. 8, the powder discharging section 27 is arranged in between the powder retaining wall 26 and the chute 29. When the molding table 5 is positioned higher than the powder discharging section 27 as shown in FIG. 8, the material powder in the powder retaining space 32 is not discharged from the powder discharging section 27. On the other hand, when the molding table 5 descends so that the powder discharging section 27 communicates with the powder retaining space 32 as shown in FIG. 9, the non-sintered material powder in the powder retaining space 32 is guided to the chute 29 by the chute guide 28 through the pathway shown by the arrow X. The chute guide 28 is fixed to the chute 29.

Figure 10:
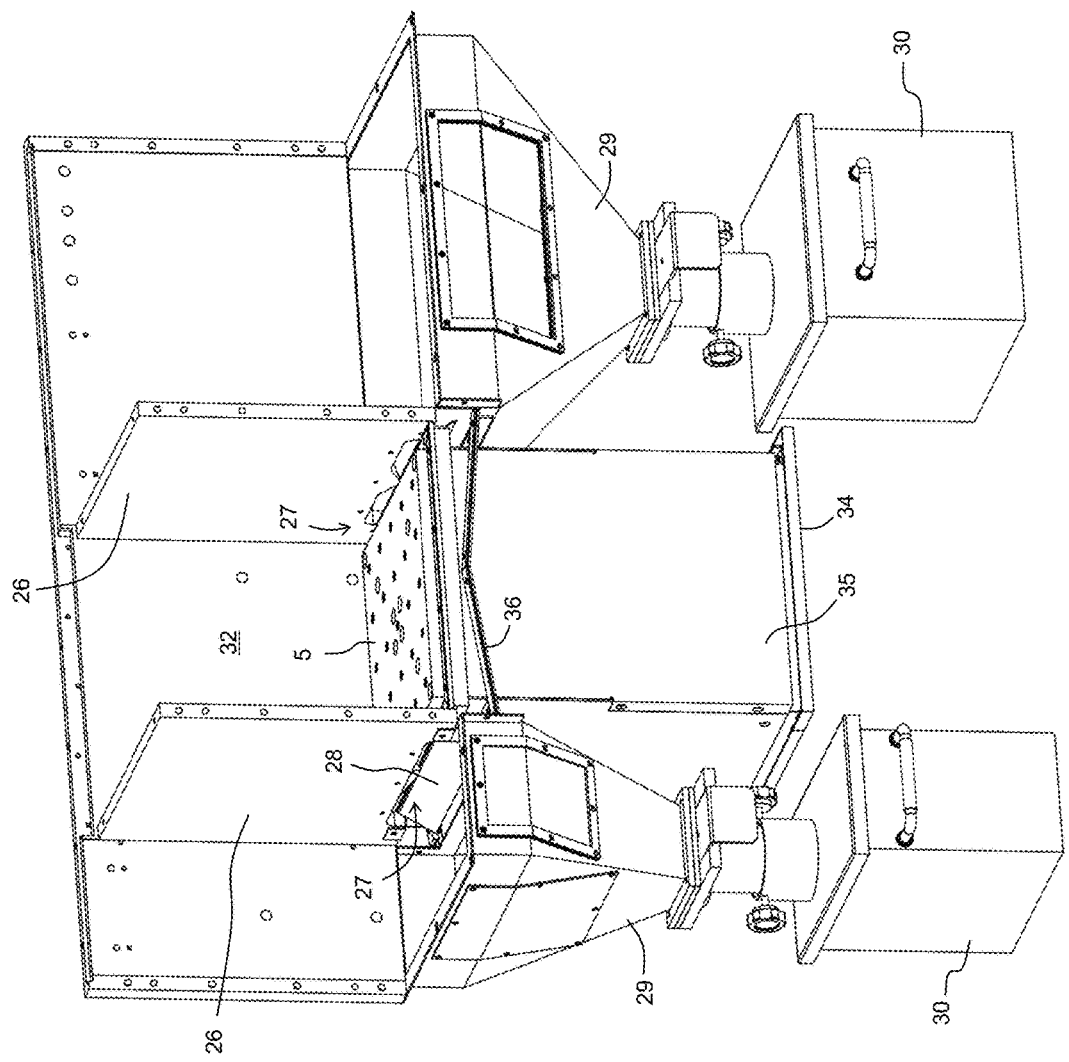
FIG. 10 is a cross sectional view showing the condition of the major portions of the powder layer forming apparatus 3 in the condition of FIG. 9.

A driving mechanism 31 is provided below the molding table 5 in order to move the molding table 5 vertically. The driving mechanism 31 is structured with a feed screw mechanism and the like, and thus the material powder may become a cause of malfunction if the material powder gets into the driving mechanism 31. Therefore, in order to prevent the material powder from getting into the driving mechanism 31, a driving mechanism partition 35 is provided so as to surround the driving mechanism 31, and a lower wiper 36 fixed to the chute 29 is provided so as to slide on the driving mechanism partition 35 when the molding table 5 moves. With such structure, the material powder fluttering in the chute 29 can be prevented from getting into the driving mechanism 31. In addition, regarding the driving mechanism partition 35, a dust tray 34 is provided below the lower wiper 36 so as to receive the material powder passing between the lower wiper 36 and the driving mechanism partition 35, as shown in FIG. 10.

The powder discharging section 27 is provided below the lower limit of the stroke of the molding table 5 during the lamination molding. By providing the powder discharging section 27 at such position, the material powder can be prevented from being discharged from the powder discharging section 27 during the lamination molding. Then, when the mode is switched after the completion of the lamination molding so as to discharge the material powder, the molding table 5 descends to a position shown in FIG. 9 and the material powder is discharged. Here, the material powder can be discharged by its weight. When the lamination molding takes a long time, the material powder is compressed and thus the discharge tends to become difficult. In such case, the material powder can be easily discharged by providing a mechanism to stimulate the material powder such as pressing of a pin.

As described, according to the present embodiment, the non-sintered material powder can be easily discharged merely by descending the molding table 5 to a predetermined position after the completion of the lamination molding. The processing time can be shortened compared with the conventional technique, and the time the operator is exposed to powder dust can be shortened, thereby improving safety. In addition, the molding table 5 can be raised after retaining the non-sintered material powder in the bucket 30, thereby sealing the molding space 1*d* from the space arranged with the bucket 30. Therefore, process such as purging of the molding space 1*d* can be conducted even while the material powder is being collected from the bucket 30, resulting in improvement in operating efficiency.

The present invention can also be carried out in the following manner.

In the afore-mentioned embodiment, a notch was provided at the lower end of the powder retaining wall 26, and then the powder discharging section 27 was provided in between the powder retaining wall 26 and the chute 29. Here, such notch is not necessary. In addition, the material powder can be directly discharged into the bucket 30 from the powder retaining space 32 without providing the chute 29. Accordingly, it is not necessary to provide the powder discharging section 27 in between the powder retaining wall 26 and the chute 29. The space below the powder retaining wall 26 can be simply used as the powder discharging section 27. In addition, a through hole can be provided in the powder retaining wall 26, and the through hole can be used as the powder discharging section 27. That is, the powder discharging section 27 can be provided in the powder retaining wall 26 itself, of can be provided in an area lower than the powder retaining wall 26.

The powder discharging section 27 can be provided at a position higher than the lower limit of the stroke of the molding table 5 during the lamination molding. In such case, it is preferable to provide a shutter to the powder discharging section 27 in order to prevent the material powder from being discharged during the lamination molding.

In the afore-mentioned embodiment, two powder discharging sections 27 were provided. Here, one or three or more powder discharging sections 27 can be provided.

EXPLANATION OF SYMBOLS

1: chamber
3: powder layer forming apparatus
5: molding table
8: material powder layer
11: recoater head
17: fume diffusing section
26: powder retaining wall
27: powder discharging section
28: chute guide
29: chute
30: bucket
31: driving mechanism
32: powder retaining space
33: upper wiper,
34: dust tray
35: driving mechanism partition
36: lower wiper
L: laser beam Although various exemplary embodiments have been shown and described, the invention is not limited to the embodiments shown. Therefore, the scope of the invention is intended to be limited solely by the scope of the claims that follow.

What is claimed is:

1. A lamination molding apparatus to conduct lamination molding using a material powder, comprising:
    a base having a molding region;
    a chamber, covering the molding region, filled with an inert gas having a predetermined concentration;
    a molding table provided in the chamber, the molding table being capable of moving vertically;
    a powder retaining wall surrounding the molding table so as to retain the material powder supplied on the molding table;
    at least a pair of powder discharging sections, opposing each other across the molding table, provided on or below the powder retaining wall, the powder discharging section being capable of discharging the material powder by its weight, and
    an upper wiper disposed on the periphery of the molding table and slidably in contact with the powder retaining wall when the molding table is moved, wherein:
    the molding table and the powder retaining wall are not directly in contact with each other.

2. The lamination molding apparatus of claim 1, further comprising a bucket to receive the material powder discharged from the powder discharging section.

3. The lamination molding apparatus of claim 1, further comprising a chute to guide the material powder discharged from the powder discharging section to the bucket.

4. The lamination molding apparatus of claim 3, further comprising a chute guide fixed to the chute to guide the material powder discharged from the powder discharging section to the chute.

5. The lamination molding apparatus of claim 3, further comprising:
    a driving mechanism partition to surround a driving mechanism of the molding table; and
    a lower wiper fixed to the chute provided at a position lower than the chute, the lower wiper sliding on the driving mechanism partition during movement of the molding table.

6. The lamination molding apparatus of claim 1, wherein the powder discharging section is provided below a lower limit of a stroke of the molding table during the lamination molding.

* * * * *